July 7, 1936.  D. H. MITCHELL  2,047,151
AUTOMOBILE RADIO RECEIVER
Filed Oct. 22, 1932   4 Sheets-Sheet 1

Inventor:
Donald H. Mitchell,
By Mueller & McLaughlin
attys.

July 7, 1936. D. H. MITCHELL 2,047,151
AUTOMOBILE RADIO RECEIVER
Filed Oct. 22, 1932 4 Sheets-Sheet 2

Inventor:
Donald H Mitchell,
By Mueller & McLaughlin attys

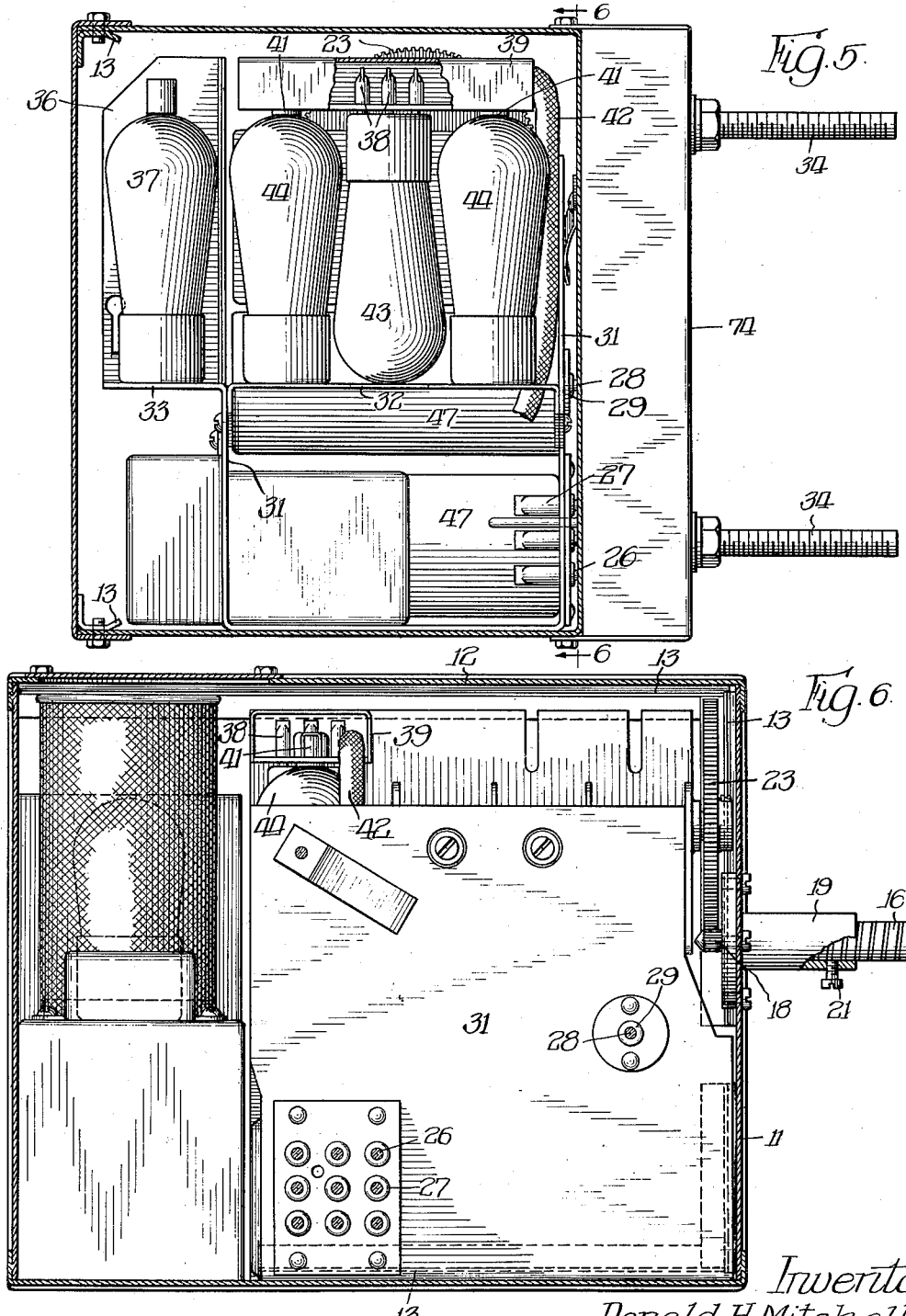

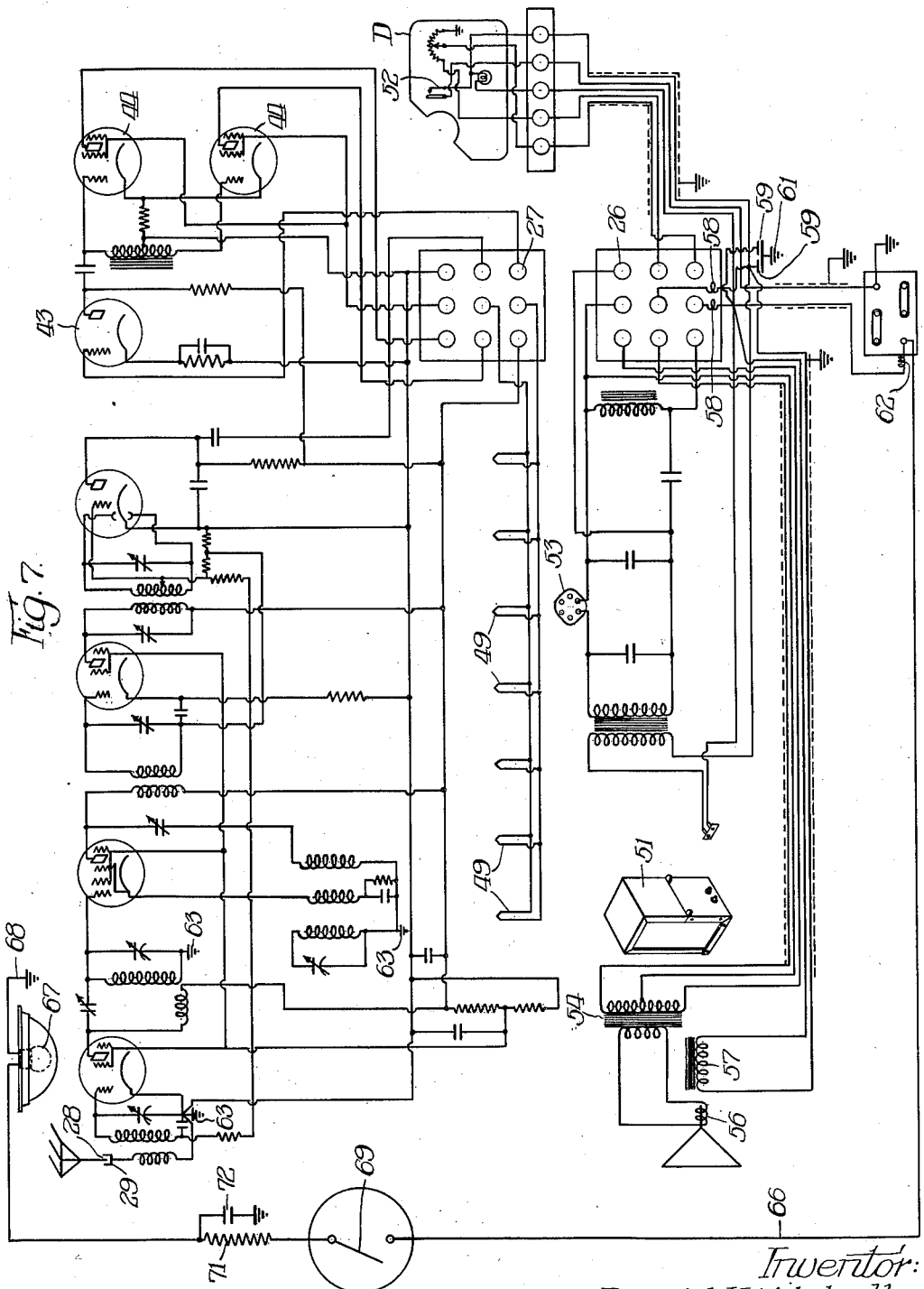

Patented July 7, 1936

2,047,151

UNITED STATES PATENT OFFICE 2,047,151

AUTOMOBILE RADIO RECEIVER

Donald H. Mitchell, Chicago, Ill., assignor to Galvin Manufacturing Corporation, Chicago, Ill., a corporation of Illinois Application October 22, 1932, Serial No. 639,081

17 Claims. (Cl. 250—14)

My invention relates in general to automobile radio receivers and more in particular to constructions, mechanical features and shielding means adapted for use in an automobile radio receiver to eliminate extraneous noise producing influences.

Heretofore in the design of automobile radio receivers, engineers have employed substantially conventional types of radio receivers and have attempted to adapt them by various means to automobile installation. Very often substantially the only departure made from the usual radio design is to condense the receiver into a small space, employ a relatively small speaker and make suitable provisions for the necessary electrical power. Very often the direct current type of tube has been used throughout, obsolete direct current receivers being condensed into a relatively small container and straight battery operation employed. Instead of employing a design which will directly eliminate stray currents found in an automobile, it became necessary to employ many different expedients for the purpose of cutting down the effect of these currents. As an example, it is known that an automobile chassis carries potential, and the chassis being made up of a number of parts, all of which were not directly connected together, it was customary to bond and couple the various body parts of the car so as to allow the high voltage from the secondary of the ignition coil to return to the motor block in but one path. This is merely an example of some of the requirements to install one of these old types of receivers to obtain even passably good results. Even then, however, these receivers have been unsatisfactory, non-uniform in performance, and required constant attention.

The principal object of my present invention is the provision of an automobile radio receiver which by the construction and design of its parts alone substantially eliminates all common motor noises and maintains dependable uniform performance under substantially all conditions.

Another object is the provision of a radio receiver chassis of improved design and adapted to be removed readily from the automobile for purposes of repair or adjustment.

Another object is the provision of an improved shielded container for an automobile radio receiver chassis whereby to eliminate all radio frequency pickup in the region of the receiver.

Another object is the provision of improved means for eliminating the influence of stray radio frequency currents in cables and other leads running to the various parts of the receiver as installed.

Another object is the provision of improved means for avoiding the necessity of bonding and coupling the various parts of the car in which the receiver is mounted.

Another object is the provision of improved means for filtering out radio frequency influences from the automobile lines of normal voltage, such as the lighting circuit.

Another object is the provision of improved means for electrically connecting the various lines running to a chassis whereby the chassis may be readily entirely removed from its container.

Other objects and features of the invention will be apparent from a consideration of the following detailed description taken with the accompanying drawings, wherein Fig. 1 illustrates one manner of mounting my receiver in a standard type of automobile;

Fig. 5 is a sectional view taken on the line 5—5 of Fig. 3;

Fig. 6 is a sectional view taken on the line 6—6 of Fig. 5; and

Fig. 7 is a circuit diagram, the separable chassis portion of the receiver being shown separated from the power supply and speaker circuit, but these portions being adapted for interconnection when the chassis is placed in its container.

The features of my present invention have to do mainly with the elimination of noise in an automobile radio receiver and in general may be employed independent of the specific type of circuit to which the receiver is wired. In Fig. 7, I show a preferred circuit with which I have obtained very good results, this figure being shown merely to illustrate the manner in which the various features of the invention may be combined in a practical installation so as to obtain by their joint influence the extremely favorable results which I have obtained. I shall first refer, therefore, to what may be termed the more mechanical portions of the receiver as shown in Figs. 1 to 6.

Figure 1:
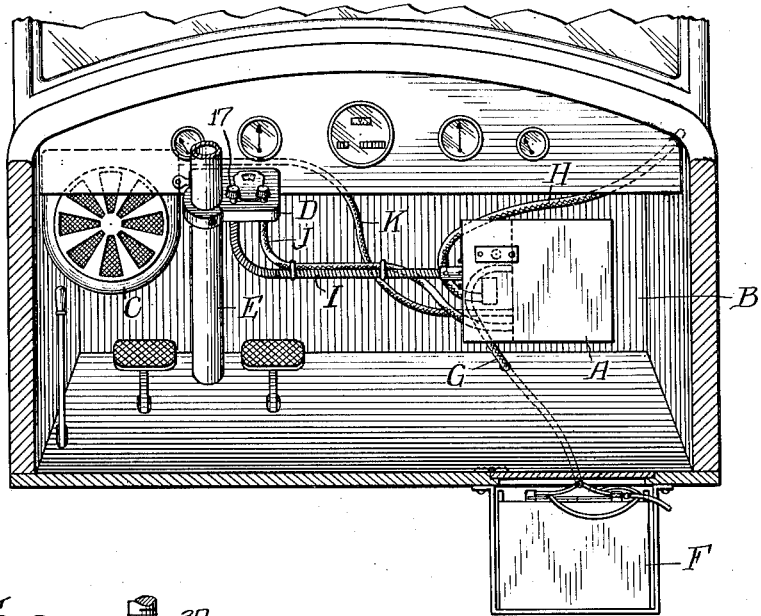

In Fig. 1 I show the front portion of an ordinary automobile in which the radio receiver A is mounted at the right of the bulk head B and the speaker C at the left of the bulk head. A remote control device D is mounted on the steering column E, power being supplied to the receiver from the usual battery F shown beneath the floor boards. The cables shown include the battery or power cable G, the antenna cable H, flexible control cable I, volume control cable J, and speaker cable K. These letters are employed in this figure for the purpose of identifying the entire installation layout. The radio receiver proper comprises an outer shielded container 11 provided with a cover 12, the container itself and cover preferably being made of sheet metal so as to serve as its own shield. The cover is provided with an inner angular peripheral strip 13 (Figs. 3 and 4) which makes the contact with the inner surface of the container proper so that this surface contacts with and is sealed to the cover at both sides. I have found that by making a firm joint between the cover and container body, in the manner shown, so that both the inside and outside surface of the body are engaged by the cover, a very large amount of noise is eliminated. I believe that this is due to the fact that with a normal type of cover even though a fairly tight fit is obtained, it is impossible to obtain the effect of a continuous wall and there is always a static charge between the contiguous surfaces which by periodic discharges produces interference which is translated through the receiver in the form of interference. Whatever the explanation may be, I have found that this construction alone eliminates a very great deal of interference which cannot be eliminated in any other way.

Figure 3:
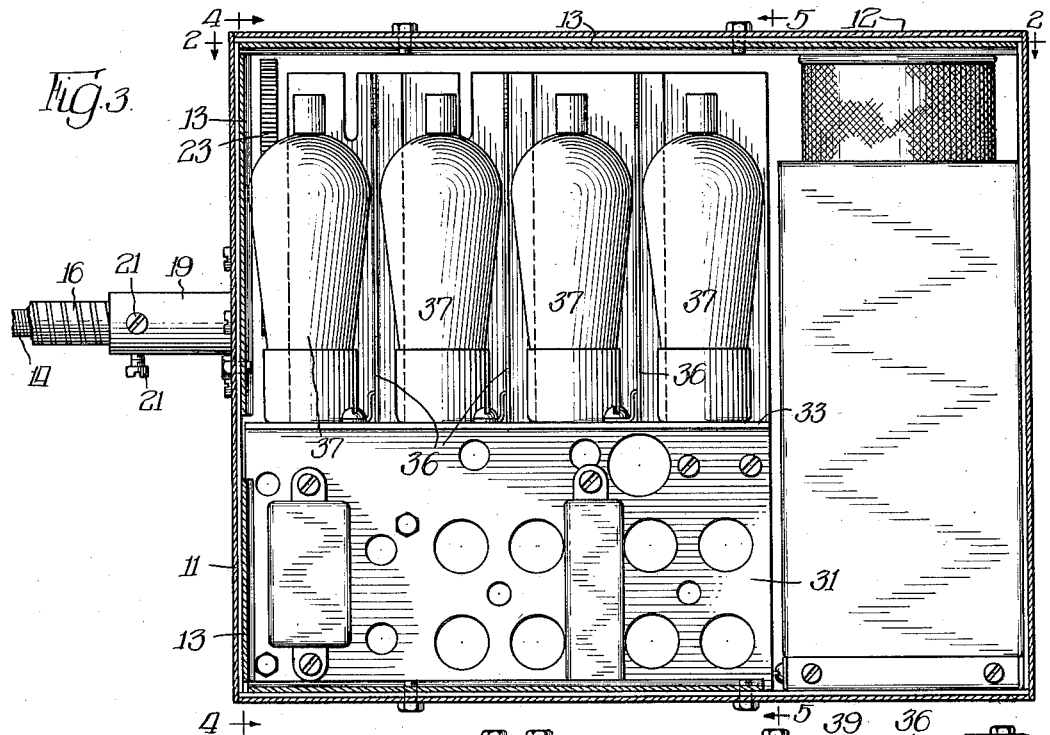
Fig. 3 is a section at right angles to the section of Fig. 2 and taken along the line 3—3 of Fig. 2 looking in the direction of the arrows.

As previously stated, the chassis portion of the receiver may be removed from the container without the necessity of disconnecting lead wires, control cables, and the like, as is usually required. The entire chassis proper, including the entire body shown in full lines within the container in Fig. 4, and everything at the left of the section line 5—5 in Fig. 3 is removable as a unit. In providing for this function, I utilize a novel driving means from the remote control unit to the variable condensers as well as novel means for effecting the necessary electrical connections between the chassis proper and the remaining portion of the receiver, including the power supply and speaker.

Figure 4:
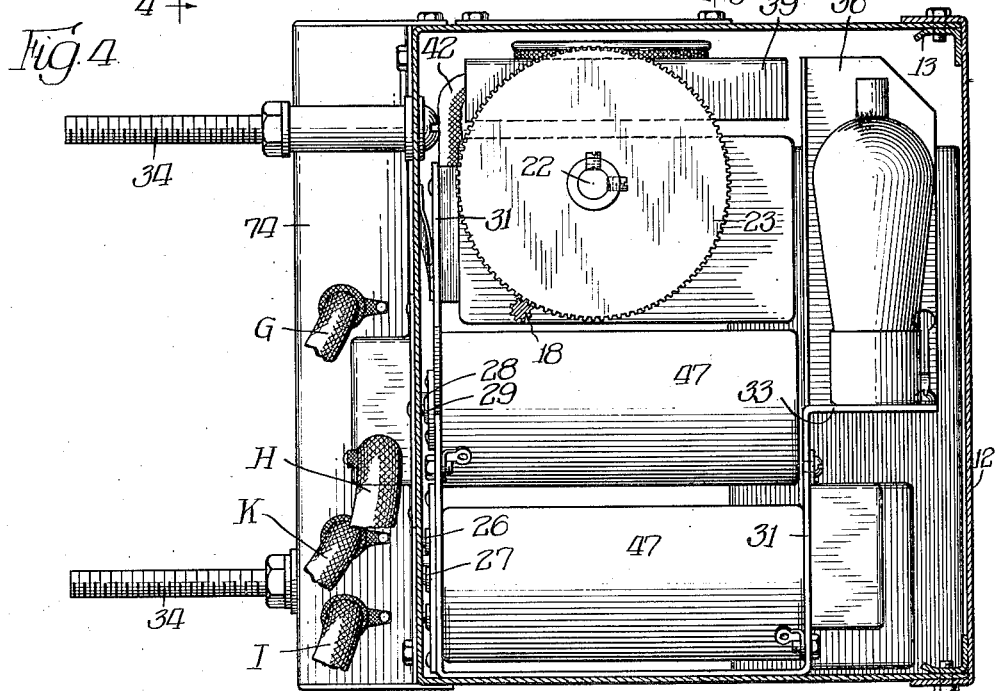
Fig. 4 is a sectional view taken along the line 4—4 of Fig. 3 looking in the direction of the arrows.

Now as to the remote control, I accomplish this by means of a flexible cable 14 having a usual sheath 16. One end of this cable terminates in a dial knob 17 on the remote control device D. The other end is provided with a pinion 18 (Figs. 4 and 6). To secure this terminal pinion 18 in position, I provide a tubular extension 19 projecting in an aperture therein, the sheath 16 being secured within this tubular projection by means of set screws 21. By tightening down the screws, the sheath may be fixed and the flexible cable having a fixed relationship to the sleeve will maintain the terminal pinion 18 at any desired position. A condenser shaft 22 carrying the variable plates of the condensers is provided with a gear 23, this gear having teeth of the same pitch as the pinion so as to mesh therewith. The gear 23 being part of the chassis is removed from the container when the chassis is removed. The direction of movement of the chassis is to the right when looking at Fig. 4. Accordingly, the gear and pinion readily separate from each other, but are adapted to slip into mesh without difficulty when the chassis is again installed in the container. To obtain the proper dial setting, it is merely necessary to set the variable condensers to maximum capacity and also to show on the remote control dial a position corresponding to maximum capacity.

The electrical connections from the chassis to the remaining portions of the receiver are made by means of jacks. Looking at Fig. 6, which is a sectional view looking into the back of the chassis, but shows the container proper in section, a plurality of plugs 26 project inwardly from the container and engage in sockets 27 provided in the chassis. These connections are for the power supply, connections from the audio frequency stage to the speaker, and the like, and are indicated by similar numerals in Fig. 7. I also provide a similar plug 28 in socket 29 for connecting the antenna lead, the plug 28 being connected to the antenna cable in a manner to be described. By means of these jack connections, including the plugs and sockets, all of the electrical connections to the chassis are made. When the chassis is extracted from its container, therefore, it is entirely separated electrically and on being again inserted in the container establishes all of the necessary electrical connections as a mere incident to its replacement. In this connection, it may be stated that for test purposes a series of extension cables also provided with plugs and jacks may be employed for interconnecting the chassis with the plugs in the interior of the container or for connecting it to still other sources of supply, speaker, antenna, and the like, if the chassis is being inspected, as, for example, during manufacture.

The chassis proper is constructed so as to occupy a minimum amount of space without sacrificing anything in electrical characteristics. As the several views show, the chassis is substantially in the form of a cube and is so designed that substantially every portion thereof is occupied by the various apparatus and equipment employed therein. Referring to Fig. 5, the general framework of the chassis includes a substantially U-shaped piece of sheet metal 31 having a pair of legs interconnected with a web 32. One leg of the U is bent at right angles to form an offset portion 33 substantially in alignment with the web or cross portion 32. In grouping the apparatus in the frame, the tubes and variable condensers are mounted in general above the web 32 and offset portion 33. The remaining portions of the apparatus, including condensers, choke coils and the like, are mounted below. All of the electrical connections with the single exception of some of the connections to the tubes are also made below this portion of the frame. In connection with the terminology "above" and "below" it may be stated that the container may be mounted in substantially any position, but in general will be mounted in the position indicated in Fig. 5, the relatively large bolts 34 secured to the container being projected through holes in the bulk head and nuts employed to clamp the container in place. The terms "above" and "below", therefore, are obviously used relatively.

Looking at Fig. 3, the portion 33 of the frame is provided with spacing strips 36 disposed between tubes 37. These tubes all carry radio frequency, and shielding is important to them. The spacers 36 together with the portion 33 of the frame and the metal container which fits close to the chassis at this point result in housing each one of these tubes within a rectangular space entirely surrounded by metal so that exceptionally good shielding is obtained with a minimum of expense, space, and material involved.

The tubes 37 are, of course, fitted into sockets and these sockets are supported by the portion 33. Below the portion 33 in Fig. 3, the various connections to the sockets, the sockets themselves, condensers, and the like, are not shown, it being sufficient to state that here also beneath the portion 33 we also have a relatively larger rectangular space in which all of the various connections therein are in turn shielded from the tubes and from the remaining portions of the apparatus.

Looking at the portion of the receiver at right angles to Fig. 3 (see Fig. 5), it is seen that I provide an equivalent construction for the detector and push-pull audio or power tubes. In order to conserve space in this location, however, I invert the center tube and provide a socket 38 in a separable member 39. This member comprises a substantially rectangular fibre frame supporting the socket and also supporting single sockets 41 for the screen grid connection to the two outside tubes. A cable 42 carrying the connections to the socket 38 and the two sockets 41 extend down through the web portion 32 to the proper connections in a rectangular space provided below the web. The only connection therefore is through the cable, this member otherwise being entirely supported on the two outside tubes and in turn supporting the inside tube. For convenience in identifying the tubes, the middle tube is indicated by the reference character 43 and the two outside tubes by the reference character 44. The tubes 44 are the two push-pull power tubes, while the tube 43 is a three element tube, the only tube in the set not provided with the fourth screen grid element. It becomes unnecessary then to provide for a screen grid connection on the web 32. Should the arrangement of the tubes be reversed, however, it is obvious that such a connection is easily provided.

Figure 2:
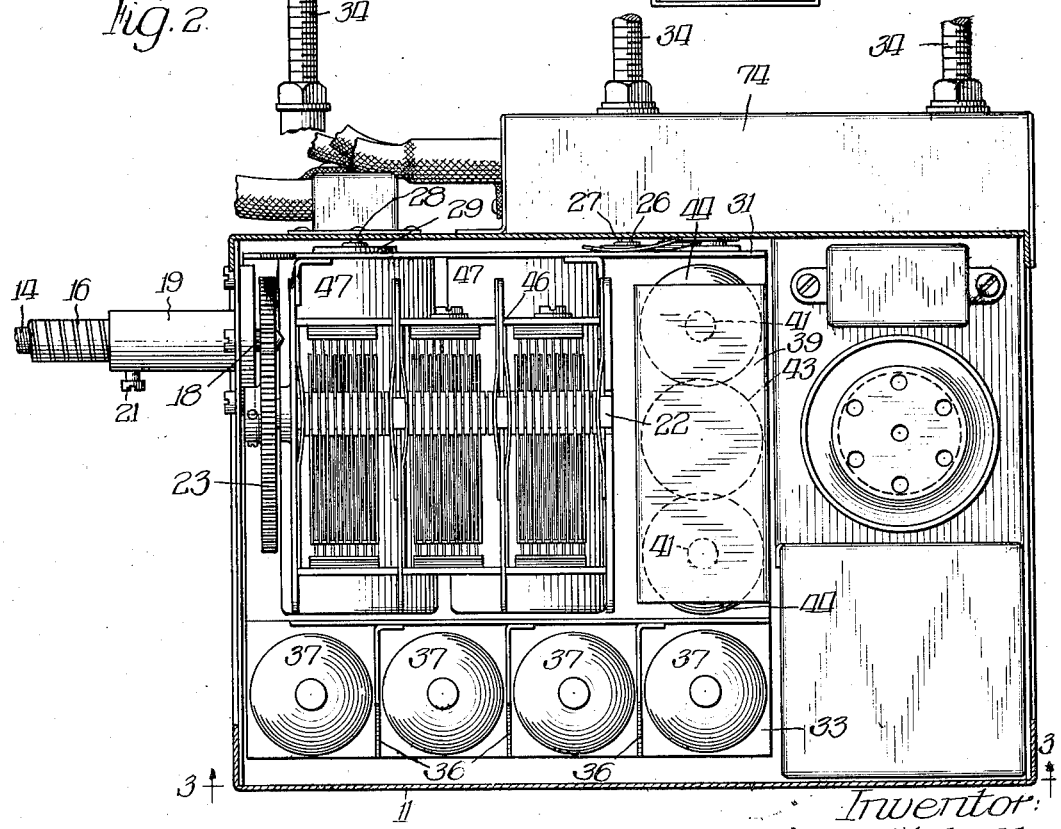
Fig. 2 is a sectional view taken on the line 2—2 of Fig. 3 showing a shielding cabinet in section and some portions of the receiver in elevation.

The web 32 does not run completely across the receiver but only to one end of a variable condenser 46 as shown in Fig. 2. It is this variable condenser, the rotor shaft of which is driven by the flexible cable connections heretofore described. I have stated heretofore that the various coils, fixed resistances and the like are mounted in the lower portion of the chassis, that is, below the portion occupied by the web 32 and offset portion 33 of the U frame. The set of my invention, as here shown, employs radio and intermediate frequency transformers 47, three in number. All of these transformers are shielded with the shields connected across between the two legs of the U frame. Two of these transformers are substantially in alignment with the web portion 32 and the remaining one is positioned on the outside of the frame and immediately below one of the transformers previously referred to. These two transformers, moreover, are placed immediately below the variable condenser, as shown in Fig. 2. Being shielded and being connected directly across the two legs of the U frame, they in turn act in a sense as a continuation of the web portion 33 so that the upper portion of the chassis is entirely shielded from the lower portion. Due to the shields at the ends of the condenser bank, as well as the shields between the individual condensers, the upper portion of the chassis is divided into a plurality of separate chambers whereby the separate portions of the apparatus carrying radio frequency are shielded from each other as well as shielded from the lower portion of the apparatus. The entire frame then resolves itself into a plurality of individual rectangular chambers, each of which is entirely surrounded by metal (the outside container included) so that a plurality of separately shielded compartments is provided, each compartment having substantially all of the space therein occupied. In this way a very compact but electrically very satisfactory receiver is obtained and at the same time a receiver which by means of the features heretofore described may have the chassis quickly and easily separated from its container for purposes of repair and adjustment.

I shall now refer to Fig. 7, the wiring diagram. As this drawing shows, I employ the usual automobile storage battery as the entire source of power. The A voltage is supplied directly from the storage battery through the jack arrangement shown, the various filaments 49 being indicated in a group separated from the cathodes of the tubes to which they apply. The B supply is provided through a usual form of transformer circuit, a current interrupter 51 of a suitable type being employed. Preferably I use a device of the character known commercially as an "elkonode". As the drawing shows, power is delivered to the elkonode through a switch 52 located in the remote control device D. The usual transformer, condensers and choke coils customarily used in a filter circuit are, of course, used and I also employ a Raytheon type of tube, the tube socket 53 being shown.

It is unnecessary to an understanding of the present invention to describe the radio circuit in detail. The circuit is of the superheterodyne type, employing the usual intermediate frequency with first and second detectors and with a push-pull amplifier in the audio stage.

The audio current is delivered, through suitable leads and connections made with the jacks previously described, to an output transformer 54, the secondary of the output transformer being connected to the usual movable coil 56 of a dynamic speaker. A separate field coil 57 is used.

Due to the action of the interrupter employed in the elkonode 51, considerable interference in the form of higher frequencies is developed which may be transmitted back through the primary leads to the battery circuit and thence to the B supply, and which also by inductance between the various conductors may be induced directly into portions of the plate circuit. To overcome this effect, I provide a pair of small inductance coils 58 in the B supply circuit, one of the coils being directly connected in the negative battery lead and the other one in the positive battery line leading from the switch 52. In advance of these two coils, I also provide a pair of condensers 59 and a connection through the condensers to ground at 61. By means of this arrangement, the higher frequencies are filtered out, thus avoiding the "hash" or interference from buzzer frequencies which would otherwise be present.

The battery cable preferably is shielded and the shield connected to ground to eliminate interference. I may also employ an inductance 62 at the end of one of the battery cable leads to buck out the higher frequencies. This inductance may be employed in addition to the metal cable shield but I have found also that in many cases the use of this inductance alone is sufficient to eliminate radio frequency pick-up on the cable or its supply. By means of this arrangement, therefore, on the battery cable and control cable running to the remote control device, all shielding may at times be done away with.

The variable condensers are shown grounded at 63. As shown in the chassis portion of the circuit diagram, this is the only grounded portion of the entire circuit. Other grounded connections, for example, from the fixed condensers are all made through these grounded connections 63 instead of being grounded separately to the chassis in the conventional way. I have found that even with a relatively small size chassis such as employed in the present case the difference in potential between different portions of the chassis is sufficient to introduce interference if more than one ground is employed. As the figures showing the structure of the chassis illustrate, the condenser frame is mounted directly onto the U shaped frame previously referred to. By bringing all grounded portions of the circuit to the condenser frame and grounding the condenser frame to the chassis at a single place, any interference due to difference in potential in the chassis itself is avoided and very much quieter operation obtained.

The normal voltage lines in an automobile, usually six volts, has an antenna action and picks up radio frequency oscillations either from the ignition circuit of the automobile or from other sources. When the antenna is placed close to one of these normal voltage lines, interference results, which has a very detrimental effect on the operation of the receiver unless this interference is eliminated. A customary location of the antenna in an automobile radio installation is on the roof of the car and usually the dome light of the car and normal voltage line leading thereto will produce noise unless a suitable filter is employed. I accordingly illustrate an improved filter means in connection with the dome light. A negative battery lead 66 leads to a dome light lamp 67, the opposite end of the light being grounded at 68. A usual type of switch 69 controls the lighting of the lamp 67. Connected directly into the line 66, I provide an inductively wound coil 71 and between the coil and the lamp I ground the conductor 66 through a condenser 72. Employing only about twenty turns in the coil 71 with the grounded condenser connections is sufficient to filter out the higher frequency without having any appreciable effect upon the normal voltage supply to the dome light lamp.

Referring now again to the structural features of the receiver, it will be understood that the elkonode and all of the apparatus employed in the power supply circuit is mounted substantially permanently either in or on the container 11. In other words, as the wiring diagram clearly suggests, these portions are not separable with the chassis, but remain connected to the receiver when the chassis is removed. An elkonode and Raytheon tube are shown in Figs. 3 and 6, respectively, together with the power supply transformer. The condensers and choke, however, are mounted in a separate housing 74 secured to the container 11, the connections being made through suitable apertures in the container and through the plugs at the bottom of the container, the connections to which are made within the housing 74. The small choke coils 58 together with the condensers 59 are mounted within this housing.

As to the output transformer 54, this is for convenience mounted in the speaker housing immediately behind the cone of the dynamic speaker. The speaker cable, therefore, includes the leads from the push-pull audio amplifier stage and the connections to the speaker cable are made through the jack including the plugs 26 and the sockets 27.

Throughout the description and in the claims I have used the term "automobile", but it is understood that this use is descriptive rather than restrictive. The term identifies conditions existing wherein interference is normally present as, for example, from the ignition system of an internal combustion engine as used, for example, in an automobile, airplane, or motorboat. The claims are to be interpreted accordingly.

I have described the features of my invention in detail so that those skilled in the art may practice the same. It is obvious, however, that I do not restrict myself to the details shown and described, the invention being limited only by the scope of the appended claims.

What I claim as new and desire to protect by Letters Patent of the United States is:

1. In a radio receiver, a container, a chassis separately supported in the container and removable therefrom by movement in a given direction and having an adjustable control provided with a rotatable shaft, a gear carried by said shaft, a flexible shaft having a pinion at one end and a dial knob at the other end rotatably supported at a distance from the chassis, and means for supporting said pinion within the container in mesh with said gear but on the side thereof opposite from the said direction of movement in removing said chassis.

2. In an automobile radio receiver, a container, a removable chassis supported in said container and having an adjustable element therein provided with a rotatable shaft, a remote control device, a flexible cable leading from the remote control device to the container, means on the remote control device for turning said flexible cable, a separable connection between said cable and said rotatable shaft, said connection being formed as an incident to the insertion of said chassis in the container.

3. In an automobile radio receiver having the usual antenna circuit, amplifying and detecting circuit, power supply circuit, and speaker circuit, a container having rigidly secured thereto one or more of said circuits and apparatus associated therewith, a chassis carrying the amplifying and detecting circuit and apparatus associated therewith removably supported in said container, a plurality of jacks, one portion of the jacks being secured within the container and the other portion of said jacks carried by the chassis, whereby said chassis may be removed and said various portions of the circuit separated by separating the jacks and said circuits again re-established as an incident to the insertion of the chassis in the container to again connect said jacks, a remote control device, an adjustable element carried by the chassis, a flexible shaft running from said remote control device to said container, and means for effecting a connection between said flexible shaft and said adjustable element when the chassis is placed in the container with said jack arrangement, said chassis being removable as a separate unit from the container merely by bodily withdrawing it.

4. In an automobile radio receiver, a metal chassis, means for connecting said metal chassis to ground, amplifying and detecting apparatus supported on said chassis and wired to provide a signal receiving and amplifying circuit, and means for providing a ground connection for a plurality of points of said circuit to a single point of said chassis whereby interference due to difference in chassis potential is eliminated.

5. A radio receiver as defined in claim 4 wherein said circuit includes a variable condenser having a metal stator supporting frame mechanically and electrically in contact with said receiver chassis, said grounded portions of the circuit being connected to said variable condenser frame.

6. In an automobile radio receiver employing an antenna, radio detecting and amplifying circuit, and power supply means for delivering power to the circuit from the usual automobile storage battery, means for preventing interference to the antenna from a normal voltage battery lead having a switch and dome light connected therein, said means including an inductance electrically connected into said lead, and a condenser having one plate electrically connected to said battery lead and the other plate connected directly to ground.

7. In an automobile radio installation employing a signal antenna mounted in the roof of said automobile adjacent a dome light for said automobile, a radio detecting and amplifying circuit, and power supply means for delivering power to the circuit from the usual storage battery in the lighting and ignition system of the automobile, means for eliminating interference from a lead carrying current from said battery to the dome light to prevent said interference from entering the radio circuit through the antenna, said means including an inductance and a condenser connected into said lead with said condenser connected to ground.

8. In an automobile radio receiver employing a plurality of radio tubes including a tipped tube having the usual tip, a chassis, means for supporting the tube on the chassis, a support for a second tube entirely unconnected to the chassis and carried above said first tube, a socket for said second tube carried by said support, a socket for the tip also carried by said support, and a cable connection to said support and forming electrical connections with said sockets.

9. In an automobile radio receiver, a chassis including a frame, said frame being broken up into a plurality of substantially rectangular shielded sections, radio apparatus mounted in said sections, said chassis with the apparatus mounted thereon being substantially a cube in shape, a substantially imperforate rectangular shielding container surrounding said chassis with said chassis removable therefrom, a second separately removable shielded container secured to the first container so that one wall of the two containers is common, power supply apparatus housed in said second container, and jack connections in said first mentioned container adapted to engage in terminals on the chassis to connect said chassis with said power supply apparatus in a manner whereby electrical connection is broken upon removal of said chassis from said first container and restored as an incident to replacement of said chassis in said first container.

10. In a radio receiver for a mobile craft, a chassis, a container for said chassis, a remote control device, an adjustable element carried by the chassis, a flexible shaft running from said remote control device to said container, and means for effecting a connection between said flexible shaft and said adjustable element as said chassis is being placed in the container.

11. In an automobile radio receiver employing a plurality of radio tubes, supported in the usual manner on a chassis, a tube socket supporting member comprising an insulating frame separable from said chassis adapted to lie freely above said chassis tubes, a tube socket supported in said frame for carrying a radio tube, a cable connection between the chassis and said separable member for making electrical connections to said socket therein, with said frame member movable and supported on said chassis tubes in an inverted position, with said tube therein extending downwardly adjacent the chassis tube.

12. A radio receiver system for mounting on a mobile craft including an outer housing closed at the back and open at the front, with a cover therefor, a receiver chassis removably supported within said housing having a radio receiver circuit thereon, with said housing having a portion of the complete receiver system circuit including a filter mounted thereon, shield means for said filter connected rigidly to said housing and a plurality of jacks including separable portions mounted on insulating material and connected with the circuit portions of the receiver system, with one of said jack portions rigidly mounted at the back of the chassis, and the other portion rigidly supported at the back of the housing in such a position that upon removal of the chassis from within the housing through the front thereof said jack portions are separated, breaking said receiver system circuit and said circuit is re-established upon insertion of the chassis within the housing to reengage said jack portions.

13. In a radio receiver, a container, a chassis for said receiver supported in the container and having thereon an adjustable control for said receiver provided with a rotatable shaft, a gear carried by said shaft, a flexible shaft having gear means secured thereto at one end and a dial knob at the other end rotatably supported at a distance from the chassis, and means for removably supporting said gear means by said container independent of said chassis but within said container and in mesh with said gear including a sheath enclosing said shaft and removably supporting said shaft and gear means, and means for removably securing said sheath to said casing.

14. In an automobile radio installation having a signal antenna mounted on said automobile, a light for said automobile, a radio receiver connected to the antenna, a line extending from the direct current supply means for the ignition system of the automobile to said light and passing near said antenna, and means in said line for filtering out interference from the ignition system to prevent the same from entering the radio receiver through the signal antenna, said means including an inductance in series with said light, and a capacity connected between said line and ground.

15. In an automobile radio receiver system having a complete electrical circuit therefor, a metal container with an open front having a cover therefor and a closed back, a chassis carrying a portion of said circuit and the apparatus associated therewith removably supported within said container, and another portion of the complete circuit with the apparatus associated therewith including a filter rigidly carried on the container at the back thereof, a plurality of jacks grouped within the container having separable portions mounted on insulating material and connected with the circuit portions of the receiver system, with one of said jack portions rigidly mounted on the receiver chassis at the back thereof, and the other portion of said jacks rigidly supported near the back of the container in connection with the filter portion apparatus in such a position that upon removal of the chassis from the metal container through the front thereof, said jack portions are separated, breaking said receiver system circuit and said circuit is re-established as an incident to the insertion of the chassis within the container to re-engage said jack portions.

16. A radio receiver as defined in claim 4 in which the plurality of points of said circuit are connected to the metal chassis through a single member of relatively low resistance.

17. In a radio receiver for vehicles, a receiver including a receiver circuit, a metal chassis for said receiver circuit and signal receiving and amplifying apparatus in connection therewith, with said circuit including a plurality of points to be grounded, means for connecting said metal chassis to ground, and means for connecting said plurality of points to one another in a single position independently of said chassis, and connecting them to ground, whereby interference due to difference in chassis potential is eliminated.

DONALD H. MITCHELL.